(12) United States Patent
Cornell et al.

(10) Patent No.: US 8,411,113 B1
(45) Date of Patent: Apr. 2, 2013

(54) LAYERED DIGITAL IMAGE DATA REORDERING AND RELATED DIGITAL IMAGE RENDERING ENGINE

(75) Inventors: Brian Cornell, Kenmore, WA (US); Sean Egan, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/306,052

(22) Filed: Nov. 29, 2011

Related U.S. Application Data

(60) Provisional application No. 61/546,395, filed on Oct. 12, 2011.

(51) Int. Cl.
*G09G 5/00* (2006.01)
*G09G 5/02* (2006.01)
*G06T 15/40* (2011.01)

(52) U.S. Cl. ......... 345/629; 345/421; 345/422; 345/592

(58) Field of Classification Search ........................ None
See application file for complete search history.

(56) References Cited

U.S. PATENT DOCUMENTS

| | | | | |
|---|---|---|---|---|
| 6,034,697 | A * | 3/2000 | Becker | 345/606 |
| 6,704,649 | B2 * | 3/2004 | Miyahara | 701/532 |
| 2004/0117358 | A1 * | 6/2004 | von Kaenel et al. | 707/3 |
| 2004/0217884 | A1 * | 11/2004 | Samadani et al. | 340/995.14 |
| 2006/0170693 | A1 * | 8/2006 | Bethune et al. | 345/568 |
| 2008/0170066 | A1 | 7/2008 | Falchetto | |
| 2009/0210388 | A1 * | 8/2009 | Elson et al. | 707/3 |
| 2010/0268458 | A1 * | 10/2010 | Becker et al. | 701/208 |
| 2011/0193871 | A1 | 8/2011 | Dunn | |

FOREIGN PATENT DOCUMENTS

JP 2005-235041 A 9/2005

OTHER PUBLICATIONS

Greg Perry, "Microsoft Office Excel 2007 Quick Reference Guide: Beta Preview", Oct. 27, 2006, Sams, Section 43.*
International Search Report and Written Opinion for Application No. PCT/US2012/056092, dated Jan. 22, 2013.

* cited by examiner

*Primary Examiner* — Kee M Tung
*Assistant Examiner* — Sing-Wai Wu
(74) *Attorney, Agent, or Firm* — Marshall, Gerstein & Borun LLP

(57) ABSTRACT

A digital image rendering system, such as a geographic map rendering system, receives image data from an image database, such as a map database, in the form of data having image features defined as sets of image objects arranged in a series of layers. The image rendering system processes the received data in a manner that allows for rendering the original layered data without rendering each original layer separately by reordering the original layered digital image data into fewer layers.

26 Claims, 10 Drawing Sheets

| Original Layer | Image Object Type | Original Image Object Order |
|---|---|---|
| 1 | Outline | 1 |
| | Interior Fill | 2 |
| | Outline | 3 |
| | Interior Fill | 4 |
| | Outline | 5 |
| | Interior Fill | 6 |
| 2 | Outline | 7 |
| | Interior Fill | 8 |
| | Outline | 9 |
| | Interior Fill | 10 |
| 3 | Outline | 11 |
| | Interior Fill | 12 |
| | Outline | 13 |
| | Interior Fill | 14 |
| | Outline | 15 |
| | Interior Fill | 16 |
| | Outline | 17 |
| | Interior Fill | 18 |

FIG. 5A

| Reordered Layer | Original Layer | Image Object Type | Image Object Revised Order | Original Image Object Order | "Z" Depth Value | Alpah Value |
|---|---|---|---|---|---|---|
| 1 | 1 | Interior Fill | 1 | 6 | 6 | 0.6 |
| | | Interior Fill | 2 | 4 | 5 | 0.6 |
| | | Interior Fill | 3 | 2 | 4 | 0.6 |
| | 2 | Interior Fill | 4 | 10 | 10 | 0.3 |
| | | Interior Fill | 5 | 8 | 9 | 0.3 |
| | 3 | Interior Fill | 6 | 18 | 18 | 0.8 |
| | | Interior Fill | 7 | 16 | 17 | 0.8 |
| | | Interior Fill | 8 | 14 | 16 | 0.8 |
| | | Interior Fill | 9 | 12 | 15 | 0.8 |
| 2 | 1 | Outline | 10 | 5 | 3 | 0.5 |
| | | Outline | 11 | 3 | 2 | 0.5 |
| | | Outline | 12 | 1 | 1 | 0.5 |
| | 2 | Outline | 13 | 9 | 8 | 0.5 |
| | | Outline | 14 | 7 | 7 | 0.5 |
| | 3 | Outline | 15 | 17 | 14 | 0.5 |
| | | Outline | 16 | 15 | 13 | 0.5 |
| | | Outline | 17 | 13 | 12 | 0.5 |
| | | Outline | 18 | 11 | 11 | 0.5 |

FIG. 5B

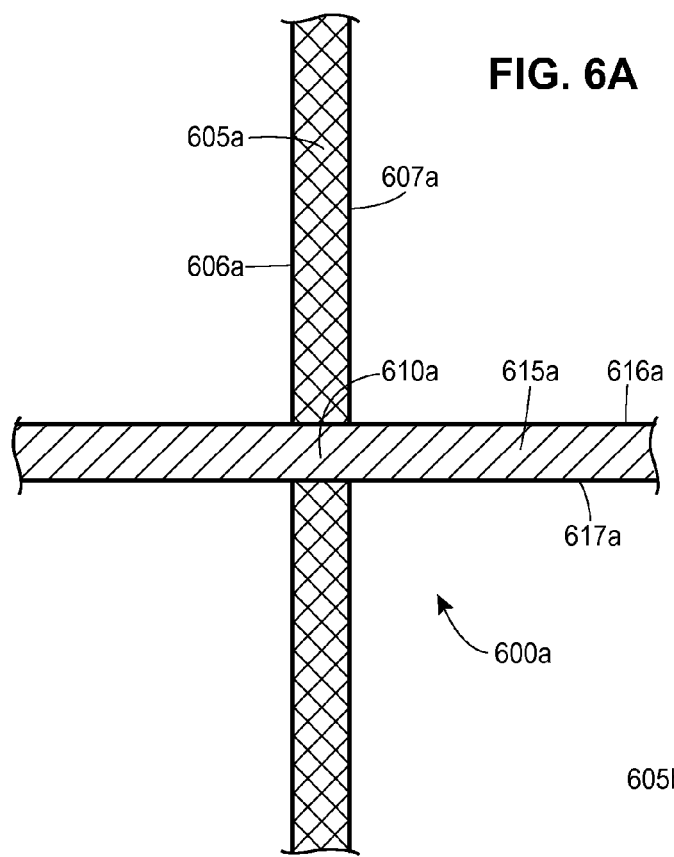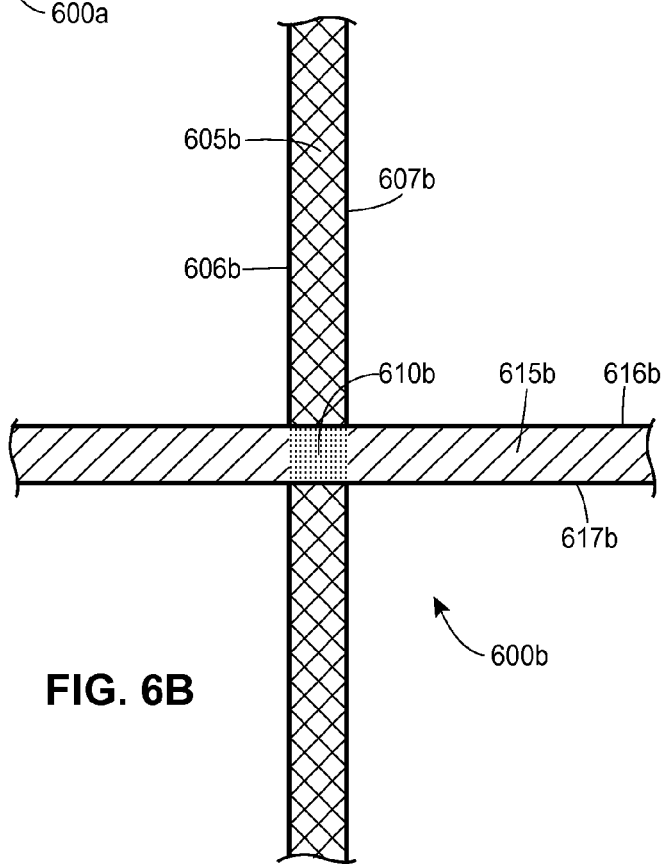

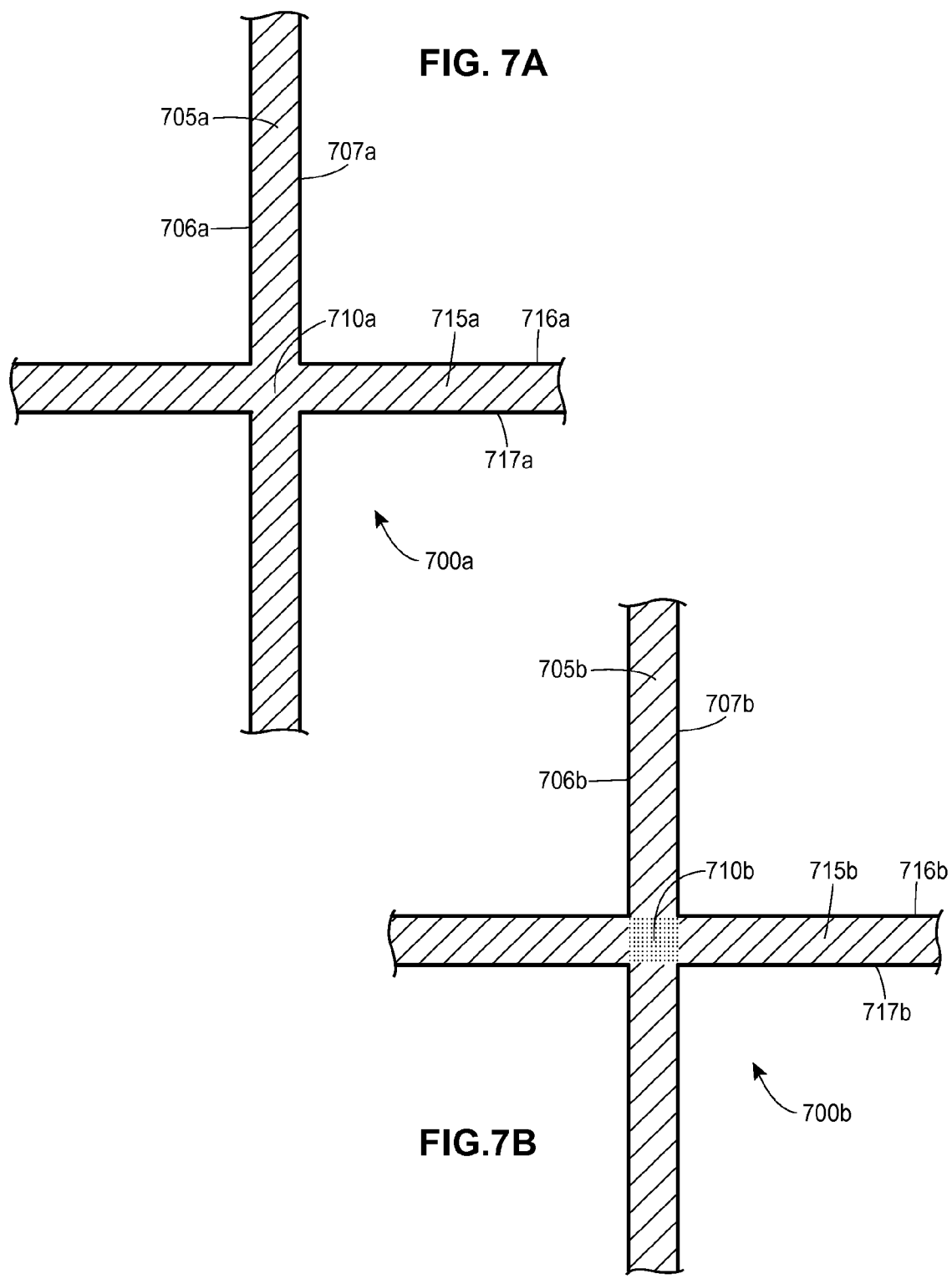

LAYERED DIGITAL IMAGE DATA REORDERING AND RELATED DIGITAL IMAGE RENDERING ENGINE

CROSS REFERENCE TO RELATED APPLICATIONS

The present application claims benefit under 35 U.S.C. §119(e) to U.S. provisional patent application Ser. No. 61/546,395, filed Oct. 12, 2011, the entire disclosure of which is incorporated herein by reference.

FIELD OF THE INVENTION

The present disclosure relates to digital image rendering systems, such as digital geographic map display systems. More specifically, the present disclosure relates to a digital image data reordering routine that, when executed reorders an original set of "layered" digital image data such that a display is rendered without having to render each layer of the original set of layered digital image data individually and without using intermediate images.

BACKGROUND

Digital images, such as geographical maps, gaming systems, anatomical diagrams, cartoons with speech bubbles and the like are found in, and may be displayed by, a wide variety of devices, including mobile phones, car navigation systems, hand-held GPS units, computers, and many websites. Although digital images are easy to view and to use from an end-user's perspective, creating a digital image is oftentimes a difficult and processor intensive task. The speed at which any given digital image display rendering device actually displays a given digital image, once directed to do so, can be slow due to the amount of data processing required. Display rendering delay is undesirable from the perspective of an end user.

Often, creation of a digital image begins with storing, in a digital image database, a set of raw digital image data corresponding to, for example, millions of streets and intersections and other features to be displayed as part of a geographic map. The raw digital map data stored in the map database is often derived from a variety of sources, with each source typically providing different amounts and types of information. For example, a first source may be a database having data related to a series of image files of satellite, or aerial, photography, a second source may be a database having data related to a series of local roadways, a third source may be a database having data related to a series of State roadways, a fourth source may be a database having data related to a series of Inter-State highways, etc. Conventionally, the resulting set of layered digital image data represents a composition of a plurality of image objects and image files dispersed within a plurality of layers. Any given image object is associated with a particular image object type, such as outlines of a roadway or an interior portion of a roadway. These individual sources of digital image map data may be compiled and stored in a digital image map database before being accessed by a client device or by other map display rendering applications and hardware.

A common methodology of rendering digital images uses what is traditionally called vector image data. Vector image data is typically used in high-resolution and fast-moving imaging systems, such as those associated with gaming systems, and in particular three-dimensional gaming systems. Generally speaking, vector image data (or vector data) includes data that defines specific image objects (also referred to as primitives) to be rendered as part of a display. In the context of a digital image representative of a geographic map, such image objects or primitives may define, for example, individual roads, text labels, areas, text boxes, buildings, railroads, rivers, points of interest markers, terrain features, bike paths, map or street labels, etc.

Customarily, layered digital map data includes a host of image objects dispersed throughout various layers. For example, a base layer of a geographical map may be an image file of a satellite, or aerial photograph of the earth's surface. A second layer may include local roadways represented by corresponding interior fill objects and outline objects (i.e. a roadway or roadways represented by a white interior with black outlines, for example). A third layer may contain State highways represented by corresponding interior fill objects and outline objects (i.e. a roadway or roadways represented by a grey interior with black outlines, for example). A fourth layer may include Inter-State highways represented by corresponding interior fill objects and outline objects (i.e. a roadway or roadways represented by an orange interior with black outlines, for example). Each image object within any given layer has various attributes, such as a shape, a color, a line size, an alpha blending value, a z-depth function value, etc. The rendered digital image map data may then be displayed as a compilation of all of these layers and image objects visually depicting a three-dimensional spatial relationship. It should be understood that any given set of original layered digital image data may have original layers formed differently, for example any combination of original layers may be combined to form a single intermediate image.

In conventional applications, layered digital image data is rendered on a corresponding client device display by rendering each layer individually. The original layers are first rasterized into intermediate images. The intermediate images are subsequently merged prior to rendering a display. The extra storage for the intermediate images and the time required to merge the intermediate images results in display rendering delay. Therefore, rendering of layered digital image map data using conventional applications requires large memory, is processor intensive and is time consuming.

SUMMARY

A computer-implemented method for reordering an original set of layered image data for use in rendering a display includes receiving at a computer device an original set of layered image data including multiple original layers of image data arranged to be rendered to form intermediate images prior to the intermediate images being rendered in a display. Each of the original layers of image data includes a plurality of image objects arranged in an intra-layer image object order. The method executes an image data reordering routine on the computer device that extracts a set of image objects of a first type from two or more of the original layers of image data and creates a set of reordered image data for use as a single reordered layer of image data for use in rendering a display. The reordered layer of image data includes image objects of the first type ordered as a function of the identity of the original layers of image data from which each of the image objects of the first type was extracted and as a function of the intra-layer image object order of the original layers of image data from which each of the image objects of the first type was extracted. The method next stores at the computer device said reordered layer of image data.

In another embodiment, a digital image rendering engine for use in rendering a display includes a communications network interface, one or more processors, one or more memories coupled to the processor and a display device coupled to the processor. A communications routine is stored on at least one of the memories that executes on one of the processors to obtain, via the communications network interface, an original set of layered digital image data including multiple original layers of image data arranged in an ascending order to be rendered in a display. Each original layer of image data includes a plurality of image objects of different types arranged in an intra-layer image object order. A digital image data reordering routine is stored on one of the memories that, when executed on one of the processors, extracts a first set of image objects of a first type from the original set of layered digital image data and creates a set of reordered digital image data. The set of reordered digital image data includes a first layer comprising image objects of the first type, wherein the digital image data reordering routine reorders the image objects of the first type so that all of the image objects of the first type from a particular one of the original layers of image data are located in the reordered digital image data prior to any of the image objects of the first type from any of the original layers of image data in the ascending order subsequent to the particular one of the original layers of image data, and so that each of the image objects of the first type from the particular one of the original layers of image data are located in the reordered digital image data after all of the image objects of any of the original layers of image data in the ascending order prior to the particular one of the original layers of image data, and wherein the image objects of the first type of each of the original layers of image data are located in the reordered digital image data in reverse order of the intra-layer image object order of each of the original layers of image data. A z-value assigning routine is stored on one of the memories that, when executed, assigns a z-value to each image object in the reordered digital image data as a function of the order of the image object in the reordered digital image data. A display rendering routine is provided that, when executed renders a display using the set of reordered digital image data.

In yet another embodiment, a digital image data reordering routine is provided for use in an imaging system having a processor and a display rendering routine and for use in rendering a display without rendering each layer of an original set of layered digital image data in an intermediate image. The digital image data reordering routine includes a first data access routine stored on a memory that, when executed on the processor, accesses an original set of layered digital image data comprising multiple original layers arranged to be rendered to form intermediate images prior to the intermediate images being merged for use in rendering a display. Each original layer including a plurality of image objects arranged in an intra-layer image object order and the original layers being ordered in an ascending order. One or more digital image data processing routines are included that, when executed on the processor, extracts a first set of image objects from said original set of layered digital image data and creates a set of reordered digital image data. The set of reordered digital image data includes a first layer including image objects of a first type, wherein the one or more digital image data processing routines reorders the image objects of the first type so that all of the image objects of the first type from a particular one of the original layers are located in the set of reordered digital image data prior to any of the image objects of the first type from any of the original layers in the ascending order subsequent to the particular one of the original layers of image data, and so that each of the image objects of the first type from the particular one of the original layers are located in the set of reordered digital image data after all of the image objects of any of the original layers in the ascending order prior to the particular one of the original layers, and wherein the image objects of the first type of each of the original layers are located in the set of reordered digital image data in reverse order of the intra-layer image object order of the original layers of image data. A z-value assigning routine is stored on one of the memories that, when executed assigns a z-value to each image object in the reordered digital image data as a function of the relative image object depth within the original set of layered digital image data.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE FIGURES

FIGS. 5A and 5B depict tables of digital image data previous to being reorganized and subsequent to being reorganized, respectively;

FIGS. 6A and 6B depict overlapping and non-intersecting roadways;

FIGS. 7A and 7B depict intersecting roadways that may be rendered using the display techniques described.

DETAILED DESCRIPTION

Figure 1:
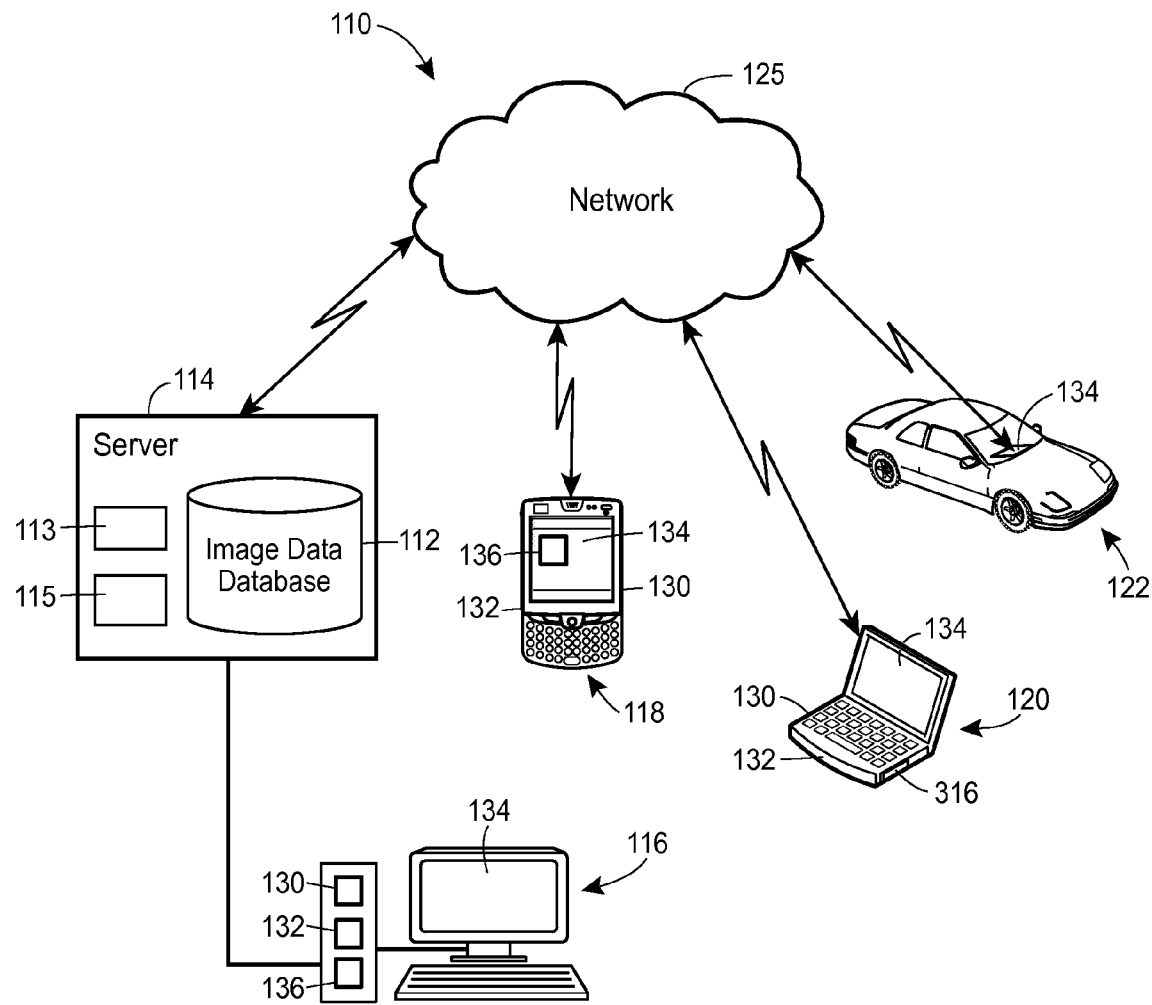
FIG. 1 is a high-level block diagram of a digital image system that implements communications between a digital image database stored in a server and one or more digital image rendering devices.

A digital image data reordering routine extracts various image objects from the individual layers of an original set of layered digital image data to create a reordered set of digital image data that requires less time to render on a display when compared to the time required to render a display using the original set of layered digital image data.

The original set of layered digital image data is ordered based upon layers, wherein a first or bottom layer represents that which is furthest away with respect to a viewer of a corresponding display and wherein a last or top layer represents that which is closest with respect to the viewer. Each original layer contains various image objects at least of a first type, such as line objects representing roadways. The digital image data reordering routine culls through the original layers and outputs at least a first layer related to the first image object type. A corresponding display rendering engine renders a display using the new layer of reordered digital image data without having to render each original layer individually, thereby reducing the time required to render a display. Rendering a display using the reordered digital image data does not require use of intermediate images prior to rendering a display, therefore, the time required to render a display is further reduced.

The image objects are reordered in a second image object order as a function of the original layer from which the image object was extracted and as a function of an original intra-layer image object order. A z-value is assigned to each image object in the reordered digital image data as a function of the relative image object depth from within the original set of layered digital image data. Thereby, for example, an original set of layered digital image data representative of a geographic map having a multitude of original layers may be condensed into two layers. A first layer of the reordered digital image data includes image objects representing the outlines of roadways and a second layer of the reordered digital image data includes image objects representing the interior portions of the respective roadways. By strategically reordering the image objects and equally strategically assigning each image object a z-value, display of features, such as tunnels represented as dashed outlines in a display and transparent overpasses providing a visual appearance of image objects that may otherwise be obscured from view within a display, is achieved.

Each original layer may contain various types of image objects (i.e. more than one image object type) such as outline objects of roadways and corresponding interior fill objects as in the earlier example. A digital image data reordering routine culls through the original layers and outputs a first layer related to a first image object type and a second layer related to a second image object type. A corresponding display rendering engine renders a display using the two new layers of reordered digital image data without having to render each original layer individually and without the use of intermediate images, thereby reducing the time required to render an image on the display.

In one example, an original set of layered digital image data may represent a geographic map having a series of roadways. In this case, a series of "interior fill" objects associated with the interior portions of the roadways and a series of "outline" objects associated with the outline portions of the roadways are contained within various layers of the original set of layered digital map data. A processor executes a digital image data reordering routine to extract the interior fill objects from the various layers of the original layered digital image data and create a first layer of digital image data. Additionally, the digital image data reordering routine extracts outline objects from the various layers of the original layered digital image data and creates a second layer of digital image data. The first and second layers of digital image data are stored on a computer-readable medium and are rendered as two layers while maintaining the look and three-dimensional context of the original digital image data which typically includes many more layers. Rendering a digital image display using the first and second layers of digital image data rendered as two layers is less processor intensive and requires less memory as compared to rendering a digital image display by rendering each layer of the original layered digital image data individually.

The term "layer" is commonly used in digital image data related terminology to describe the different levels (i.e. z-depth) at which an image object or image file may be located with respect to one another and with respect to a viewer of a corresponding display. Individual layers can be stacked, merged or defined when creating a digital image. Each layer can be partially obscured allowing at least portions of objects within a given layer to be hidden or shown in a translucent manner with respect to at least portions of image objects within a different layer. Individual layers may be combined, such that two or more original layers form a single new layer. For the purpose of editing, working with layers allows changes to be made globally within a given layer while other layer(s) remain unedited entirely. Once two or more layers are combined to create a single layer, subsequent editing is performed on the single layer as whole. Customarily, each layer contained within a set of layered digital image data is rasterized to form intermediate images. The intermediate images are then merged prior to being rendered on a display.

The digital image data reordering routine described herein is executed to reduce the number of layers that need to be rendered to form a given display or image. A display is rendered using the reordered digital image data without use of intermediate images. With respect to the reordered digital image data, the term "layer" is retained to reflect the correlation between rendering a layer of digital image data for display and the rendering sequence. The depth of any given image object or image file is no longer determined by layer location in the reordered data. In the reordered digital image data, the different levels (i.e. z-depth) at which an image object or image file may be located with respect to one another and with respect to a viewer of a corresponding display are determined by the individually assigned z-value.

The relative image object depth is defined in the original set of layered digital image data according to which layer any given image object is located. The lower the layer number, the further away the image object will appear from the viewer's perspective. In the context of displaying a road map, layers are generally used to depict a three dimensional relationship between the individual roadways, showing which roadways pass over or under other roadways, intersections of roadways, bridges and tunnels.

Referring now to FIG. 1, a digital image system 110 which is configured to use a digital image data reordering routine, includes a digital image database 112 stored in a server 114 or in multiple servers located at, for example, a central site or at various different spaced apart sites. The digital image system 110 also includes multiple digital image client devices 116, 118, 120, and 122, each of which stores and executes a digital image data reordering routine and a display rendering routine, or comprises a display rendering engine. The client devices 116-122 may be connected to the server 114 via any hardwired or wireless communication network 125, including for example a hardwired or wireless LAN, MAN or WAN, WiFi, the Internet, or any combination thereof. The client devices 116-122 may be, for example, mobile phone devices (118), computers such a laptop, desktop or other types of computers (116, 120) or components of other imaging systems such components of automobile navigation systems (122), etc. Moreover, the client devices 116-122 may be communicatively connected to the server 114 via any suitable communication system, such as via any publicly available or privately owned communication network, including those that use hardwired based communication structures, such as telephone and cable hardware, and/or wireless communication structures, such as wireless communication networks, including for example, wireless LANs and WANs, satellite and cellular phone communication systems, etc.

The digital image database 112 may store any desired types or kinds of digital image data including raster image data and vector image data. However, the digital image data reordering routines and display rendering routines described herein are best suited for use with vector image data which defines or includes a series of vertices or vertex data points for each of numerous sets of image objects. Generally, each of the image objects defined by the vector data will have a plurality of vertices associated therewith. The vertices are used to render each image object on a display device of one or more of the client devices 116-122. In one embodiment, each of the client devices 116-122 may include a display rendering engine having one or more processors 130, one or more memories 132, a display device 134, and in many cases a rasterizer or graphics card 136, which are generally interconnected in known manners to render displays on the associated display device 134 using a display rendering routine. The display device 134 for any particular client device 116-122 may be any type of electronic display device such as a liquid crystal display (LCD), a light emitting diode (LED) display, a plasma display, a cathode ray tube (CRT) display, or any other type of known or suitable electronic display.

Generally, the digital image system 110 of FIG. 1 operates such that a user, at one of the client devices 116-122, initiates execution of a digital image application (not shown in FIG. 1) that operates to communicate with a server 114 to obtain a set, or sets of original layered digital image data from a digital image database 112. The given client device executes a digital image data reordering routine that extracts image objects from the various layers of the original layered digital image data to produce reordered digital image data that has fewer layers than the original layered digital image data. The client devices then execute a display rendering routine (not shown in FIG. 1) that renders a display using the reordered digital image data. The digital image application may allow the user, for example, to view different geographical portions of the original layered digital image data stored in the digital image database 112, to zoom in or zoom out on a particular geographical location, to rotate, spin or change the two-dimensional or three-dimensional viewing angle of the digital image being displayed, etc.

More particularly, when rendering an image on a display device 134 using the image system described herein, each of the client devices 116-122 downloads digital image data from a digital image database 112 and processes that data using one or more digital image data reordering routines. The reordered digital image data has fewer layers than the original layered digital image data and so the reordered data can be used by the client device to render an image on an associated display device 134 in a less processor intensive manner. A digital image data reordering routine that performs this operation is stored on a memory 132 of a client device and is executed by a processor 130 in the client device. Moreover, an alpha attribute value assigning and blending routine and a z-depth function value assigning routine may also be stored on the memory 132 and executed on the processor 130 to assign an alpha attribute value and a z-depth function value to each image object, respectively. In a related embodiment, a client device executes a display rendering routine on a client device processor 130 that renders a display using the reordered digital image data.

Figure 2:
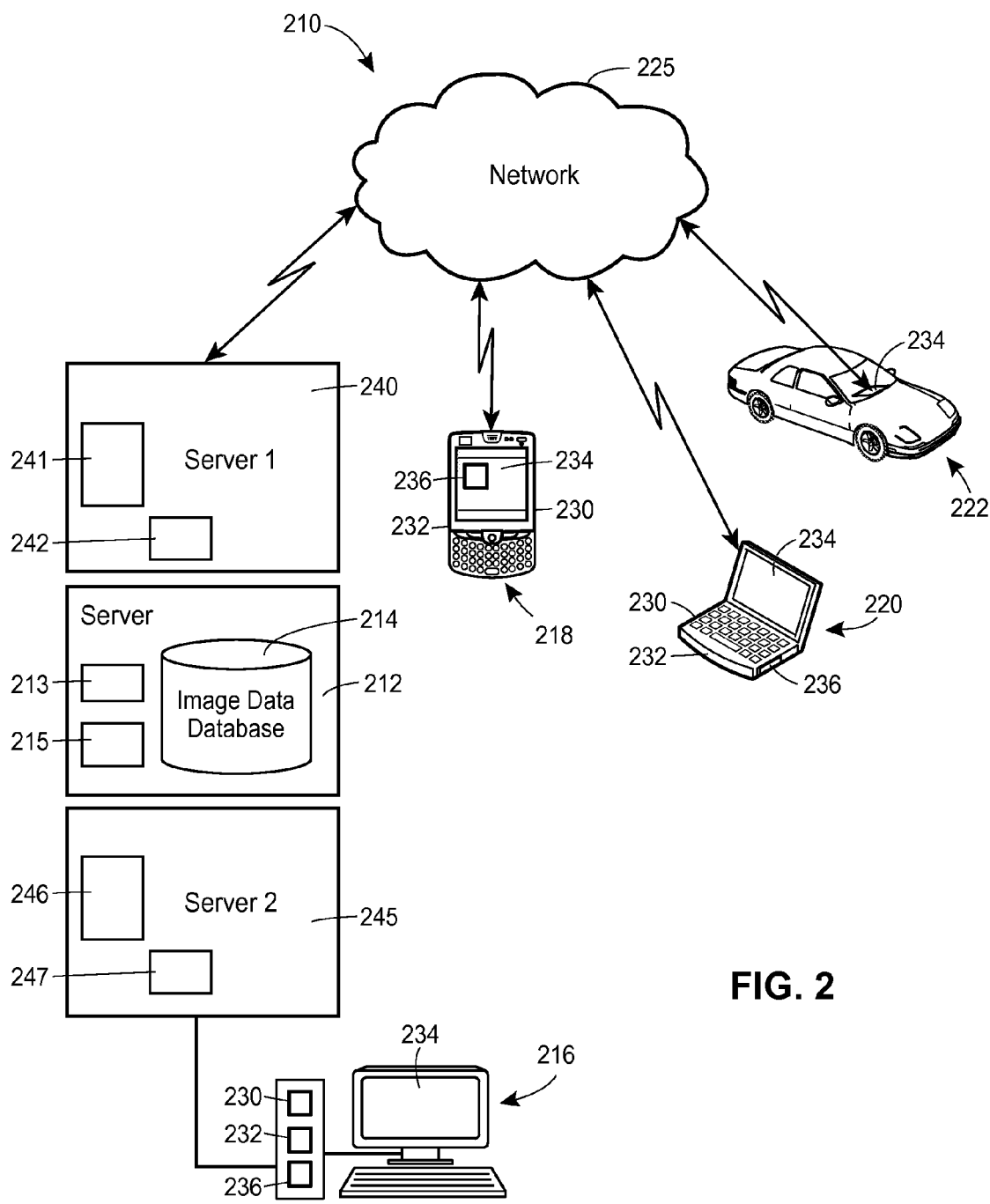
FIG. 2 is a high-level block diagram of a digital imaging system that implements communications between a digital image database stored in a first server, a digital image data reorganizer stored on at least one second server, and one or more digital image rendering devices.

Generally, the digital image system 210 of FIG. 2 operates, from a user's perspective, similar to the digital image system 110 of FIG. 1. In the digital image system 210 of FIG. 2, a digital image data reordering routine is stored on a memory 215, 242, 247 in one of the servers 214, 240, 245 and is executed by a processor 213, 241, 246, respectively. Although the digital image systems 110, 210 operate, from a user's perspective, similarly, the digital image data reordering routine of FIG. 1 is stored in memory 132 of a client device and is executed on the client device processor 130. Layered digital image data is communicated to the client devices 116-122 of FIG. 1, whereas reordered digital image data is communicated to the client devices 216-222 of FIG. 2. The remaining elements with two-hundred series reference numbers depicted in FIG. 2 are similar to that described with reference to the corresponding elements with one-hundred series reference numbers of FIG. 1.

When used within a digital image system 210 of FIG. 2, an alpha attribute value assigning and blending routine and/or a z-depth function value assigning routine may also be stored on a memory 232 and executed on a processor 230 and operate to assign an alpha attribute value and/or a z-depth function value to each image object. Alternatively, when used within a digital image system 210 of FIG. 2, an alpha attribute value assigning and blending routine and/or a z-depth function value assigning routine may be stored on any one of the memories 213, 241, 246 and executed on the respective processor 215, 242, 247 that assigns an alpha attribute value and a z-depth function value to each image object.

Figure 3:
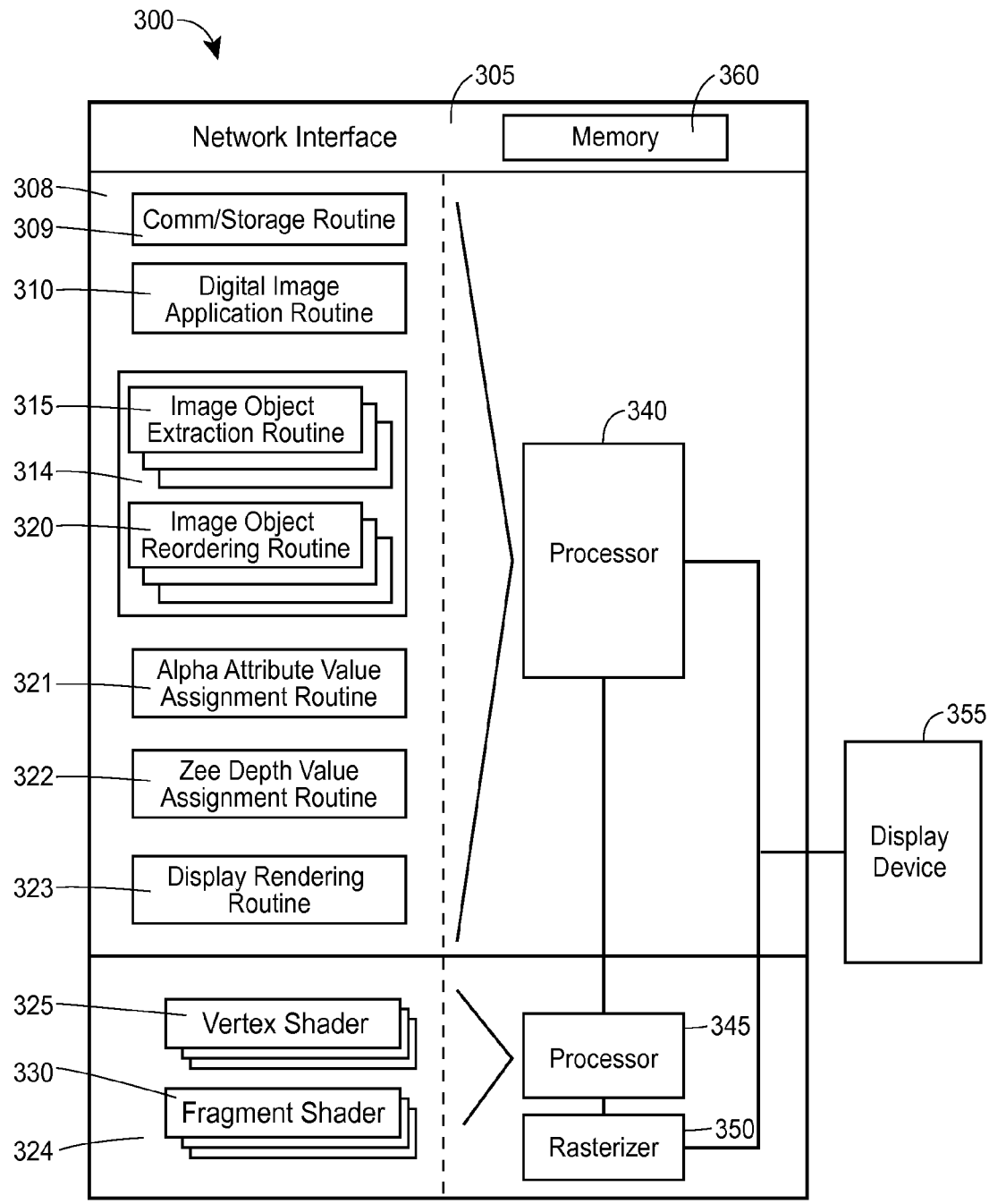
FIG. 3 depicts a high level block diagram of a digital image data rendering engine used to render layered digital image data.

FIG. 3 depicts a display rendering engine 300 associated with or implemented by one of the client devices 116-122, 216-222. When used in combination with the digital image system 110 of FIG. 1, the client devices 116-122 execute both a digital image data reordering routine 314 and a display rendering routine 323. When used in combination with the digital image system 210 of FIG. 2, the client devices 216-222 execute only a display rendering routine 323, while a digital image data reordering routine 314 is executed, at least in part, on one of the servers 214, 240, 245. It should be understood that a portion of a digital image data reordering routine 314, such as the image object extraction routine 315 for example, may be executed on one of the servers 214, 240, 245, while the image object reordering routine 320, for example, is executed on a client device 216-222.

The display rendering engine 300 of FIG. 3 includes two processors 340, 345, three memories 308, 324, 360, a user interface 355 and a rasterizer 350. The processor 345, the memory 324 and the rasterizer 350 are disposed on a separate graphics card (denoted below the horizontal line). Alternatively, a single processor may be used to implement a display rendering engine. In addition, the display rendering engine 300 includes a network interface 305. The memories 308, 324 and 360 may include either or both volatile and non-volatile memory.

A communications and storage routine 309 and one or more digital image applications 310 are stored on the memory 308. The communications and storage routine 309 is executed on the processor 340 to acquire and store on a memory 360 a set, or sets of digital image data received via a network interface 305. The network interface 305 includes any well known software and/or hardware components that operate to communicate with, for example, one of the servers 114, 214, 240, 245 via a hardwired or wireless communications network. The memory 360 may be a buffer or a volatile memory, for example. In digital image systems 110 as depicted in FIG. 1, the communications and storage routine 309 is executed to acquire and store a set, or sets of original layered digital image data from a digital image database 112 via the server 114. In digital image systems 210 as depicted in FIG. 2, the communications and storage routine 309 is executed to acquire and store a set, or sets of reordered digital image data from one of the servers 214, 240, 245, wherein the given server 214, 240, 245 executes the digital image data reordering routine 314. As depicted in FIG. 3, a digital image data reordering routine 314 may comprise one or more image object extraction routines 315 and one or more image object reordering routines 320 stored on the memory 308. It should be understood that an image object extraction routine 315 and an image object reordering routine 320 may be combined, stored in the memory 308 and executed on the processor 340.

In operation, the digital image application 310 executes on the processor 340, in response to a user initiation, to determine the particular set, or sets of digital image data desired for display using, for example, user input, global positioning system (GPS) signals, pre-stored logic or programming, etc. The digital image application 310 interacts with a digital image database 112, 212 using the communications and storage routine 309 by communicating with one of the servers 114, 214, 240, 245 through the network interface 305 to obtain the desired digital image data. The requested digital image data is returned via the network interface 305 and is stored in the memory 360. In a particular example, the digital image data is downloaded from a database 112, 212. The digital image data may be a compact, structured, or otherwise optimized version of the ultimate vector data to be used to render a display and a corresponding digital image application 310 may operate to transform the downloaded vector data into specific vertex data points using the processor 340. Generally, the digital image data stored in the digital image database 112, 212 may include vector data and possibly one or more lookup tables defining data for each of a set of vertices associated with a number of different image objects. More particularly, the vector data for each image object may include multiple vertices associated with one or more triangles making up the particular image object.

An alpha attribute value assigning and blending routine 321 is also stored on the memory 308 and is executed on the processor 340 to assign an alpha attribute value to each image object and to alpha blend overlapping portions of image objects of the same type. Likewise, a z-depth function value assigning routine 322 is stored on the memory 308 and is executed on the processor 340 in conjunction with the digital image data reordering routine to assign a z-depth function value to each image object. Of course, the alpha attribute value assigning and blending routine and the z-depth function value assigning routine may be combined, stored and executed as a single routine.

A graphics card having a fragment shader 330 may be utilized to compute the z-value and a blended alpha value for every pixel processed. On some embedded graphics cards, the z-value is directly computed based on the vertices produced by a vertex shader 325. WebGL, which is based on an embedded API, may be utilized to compute the z-value.

Figure 4A:
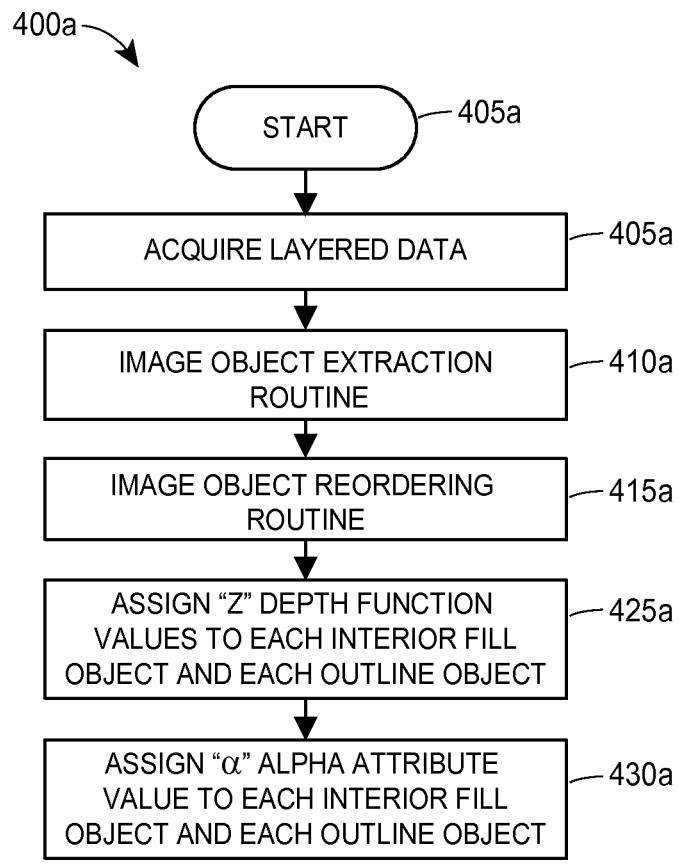
FIGS. 4A and 4B illustrate example routines or process flow diagrams that operate to reorder an original set of digital image data represented in the table of FIG. 5A to produce a reordered set of image data represented in the table of FIG. 5B.

With reference to FIGS. 4A, 5A and 5B a specific example of a display rendering engine 300 is described in which the display rendering engine 300 is configured as a digital geographical map rendering device. In this example, a digital image data reordering and attribute assignment routine 400a is executed to obtain a set of original layered digital image data 500a as depicted in FIG. 5A. In particular, the digital image data reordering and attribute assignment routine 400a is initiated via a start block 405a. Next, the original layered digital image data 500a that represents a series of roadways including a plurality of outline objects and a plurality of interior fill objects dispersed among a plurality of layers is acquired in a block 405a. The outline objects visually represent outline portions of the roadways and the interior fill objects visually represent interior portions of the roadways. The set of original layered digital image data 500a of the example of FIG. 5A includes original layer one, original layer two and original layer three as depicted in column 505a. Original layer one includes three outline objects and three interior fill objects as depicted in column 510a. Original layer two includes two outline objects and two interior fill objects as depicted in column 510a. The original layer three includes four outline objects and four interior fill objects as depicted in column 510a. The individual image objects of the original layered digital image data are originally ordered according to the original image object order depicted in column 515a. It should be understood, however, that the original layered digital image data may include any number of original layers and any number of image object types may be contained in each original layer and that the original layered digital image data of FIG. 5A is only one example.

With further reference to FIG. 4A, an image object extraction block 415a is executed to extract the interior fill objects from the original set of layered digital image data to create reordered layer one as depicted in column 520b of FIG. 5B. The image object extraction block 410a further extracts the outline objects from the original set of layered digital image data to create reordered layer two as depicted in column 520b of FIG. 5B. The image object reordering block 415a is executed to reorder the extracted interior fill objects as depicted in column 510b of FIG. 5B. The image object reordering block 415a further reorders the extracted outline objects as depicted in column 510b of FIG. 5B. As can be seen from comparing column 520b with column 505a, the reordered digital image data has fewer layers than the original layered digital image data. It should be understood that the original set of layered digital image data may have only one image object type, line objects representing roadways for example. The original set of layered digital image data may contain three or more image object types.

With reference again to FIG. 4A, a z-value is assigned to each image object in block 425a. In digital image data related terminology, "z-buffering" is the term used in regard to management of image object or image file depth coordinates in three-dimensional (3-D) graphics. Z-buffering is usually performed in hardware, however, sometimes it is performed in software. Z-buffering provides one solution to the visibility problem, which is a problem associated with deciding which image objects of a rendered display are to be visible, and which are to be hidden. When an image object is rendered by a 3D graphics card, the depth of a generated pixel (z coordinate) is stored in a buffer (the z-buffer or depth buffer). This buffer is usually arranged as a two-dimensional array (x-y) with one element for each pixel. When another image object is to be rendered in the same pixel, the graphics card compares the two depths and chooses the depth associated with the image object closer to the viewer. The chosen depth is then saved to the z-buffer. In the end, the z-buffer enables the graphics card to correctly reproduce the desired depth perception (e.g. a closer object hides a farther one). "Z-culling" is early pixel elimination based on pixel depth. Z-culling provides an increase in performance when rendering hidden surfaces since "hidden" pixels are eliminated. Hidden pixel elimination is a direct benefit of z-buffering, where the depth of each pixel candidate is compared to the depth of existing geometry behind which it might be hidden.

At the start of rendering a new display, the z-buffer is set to a pre-defined value, usually 1.0, because this value is the upper limit (on a scale of 0 to 1) of depth, meaning that no image object is present at this point through the viewing frustum. When using a z-buffer, a pixel can be culled (eliminated) as soon as its depth is known to be hidden, which makes it possible to skip the entire process of lighting and texturing a pixel that would not be visible anyway. Also, time-consuming pixel shaders will generally not be executed for the culled pixels. This makes z-culling a good optimization candidate in situations where fill rate, lighting, texturing or pixel shaders are limiting factors.

As a general matter, a z-depth function value is assigned to each image object such that the relative z-depth of each image object of the original layered digital image data is retained in the reordered digital image data. The final z-value for a given image object is a function of: 1) the image object type, 2) the original layer within which the image object was located, and 3) the original order of the image object. More specifically, image objects of a first type extracted from the first layer of the original layered digital image data are assigned the lowest z-values as a function of their original order. The next lowest z-values are assigned to the image objects of a second type extracted from the first layer of the original layered digital image data as a function of their original order. This z-value assignment sequence is continued for each image object type contained within the first layer of the original layered digital image data until all image objects of the first layer of the original layered digital image data are assigned. Once a z-value is assigned to each image object extracted from the first layer of the original layered digital image data, z-values are assigned to the first image object type extracted from the second layer of the original digital image data. This z-value assigning sequence is continued until the z-value of the last image object type of the last layer of the original layered digital image data is assigned.

With reference to FIG. 5B, the z-depth function values are assigned beginning with the outline object that is furthest from the viewer within the original layer that is furthest away from the viewer (i.e. outline object 1 in the original image object order). The z-depth function value assigning routine continues with assignment of the remaining outline objects extracted from the first layer of the original layered digital image data progressing to the outline object contained within the first original layer that is closest to a viewer (i.e. outline object 5 in the original image object order). The z-depth function value assigning routine continues next to assign values to the interior fill objects extracted from the first original layer beginning with the interior fill object furthest away from a viewer (i.e. interior fill object 2 in the original image object order) and progressing to the interior fill object extracted from the first original layer that is closest to a viewer (i.e. interior fill object 6 in the original image object order). The remainder of the z-depth function values are assigned to the outline objects and interior fill objects following this pattern and progressing to the original layer that is closest to the viewer. It should be understood that image objects of the same type contained within any given layer of the original layered digital image data may be assigned the same z-value, as opposed to z-values that increase in proportion to the original image object order.

A z-depth function value assigning routine is executed in block 425*a* that assigns z-depth function values to each interior fill object and each outline object as depicted in column 530*b*. The z-depth function values associated with the outline objects of the first original layer are assigned beginning at zero to reflect the fact that they will be displayed furthest away from the perspective of a viewer (i.e. z-values of 3, 2, 1). The z-depth function values associated with the interior fill objects of the first original layer are assigned the next z-values (i.e. z-values 6, 5, 4). The z-depth function values associated with the outline objects of the second original layer are assigned the next z-values (i.e. z-values 8, 7). The z-depth function values associated with the interior fill objects of the second original layer are assigned the next z-values (i.e. z-values 10, 9). The z-depth function values associated with the outline objects of the third original layer are assigned the next z-values (i.e. z-values 14, 13, 12, 11). The z-depth function values associated with the interior fill objects of the third original layer are assigned the next z-values (i.e. z-values 18, 17, 16, 15). As a result of the execution of the blocks 415*a*, 425*a*, 430*a*, the relative depth relationship for each image object contained within an original set of layered digital image data is retained in the reordered digital image data by assigning a z-depth function value to each image object.

With further reference to FIGS. 4A and 5B, an alpha attribute value assigning and blending routine is executed in block 430*a* that assigns an alpha attribute value to each interior fill object and each outline object as depicted in column 535*b*. The alpha attribute values are used when rendering a display to visually portray overlapping portions of two or more image objects. In general, the alpha attribute value associated with each image object contained in the original set of layered digital image data is maintained in the reordered digital image data. Alpha attribute values typically correspond to a given color. It should be understood that any given alpha attribute value may be assigned depending on the viewer's preference, for example.

Digital image compositing is the process of digitally assembling multiple digital images to create one final image, typically for print or display. Digital image compositing represents the evolution of optical film compositing into the digital realm. In digital image data related terminology, "alpha blending" is the term used where an opacity value, alpha ("α"), is used to control the proportions of two or more input pixel values composited into a single output pixel value. Alpha blending is used to achieve the desired visual effect described with respect to FIGS. 6B, 7B, 8 and 9. Alpha blending may be performed according to any one of a number of mathematical computations, the following description illustrates exemplary computations:

a foreground pixel, f
a background pixel, b
a composited pixel, c
and
α, the opacity value of the foreground pixel. (α=1 for an opaque foreground, α=0 for a completely transparent foreground).

Considering all three color channels (i.e. red—denoted by subscript r, green—denoted by subscript g, and blue—denoted by subscript b), and assuming that the color channels are expressed in a γ=1 color space (i.e. that is to say, the measured values are proportional to light intensity), results in:

$$c_r = \alpha f_r + (1-\alpha) b_r$$

$$c_g = \alpha f_g + (1-\alpha) b_g$$

$$c_b = \alpha f_b + (1-\alpha) b_b$$

In a case in which four layers are to be alpha blended to produce a final image (i.e. a portion of a geographic map having three overlapping roadways superimposed over an aerial photograph, for example): $F=A*(B*(C*D))$ where A, B, C, D are partially transparent image objects and "*" denotes a compositing operator (with the left layer on top of the right layer). If only layer C changes, re-blending of all of the layers when computing F should be avoided. Without any special considerations, four full-image blends would need to occur. For compositing operators that are commutative, such as additive blending, it is safe to re-order the blending operations. In this case, $T=A*(B*D)$ is computed only once and $T*C$ is blended to produce F in a single operation. Unfortunately, most operators are not commutative. However, many are associative. Therefore, it is safe to re-group operations without changing their order. In this case it is possible to compute $S=A*B$ once and save this result. To form F with an associative operator, two additional compositing operations are performed to integrate the new layer C: $F=S*(C*D)$. Note that this expression indicates compositing C with all of the layers below it in one step and then blending all of the layers on top of it with the previous result to produce the final image in the second step.

If all layers of an image change regularly and need to be composited (such as in distributed rendering), the commutativity of a compositing operator can still be exploited to speed up computation through parallelism even when there is no gain from pre-computation. Again, consider the image F=A*(B*(C*D)). Each compositing operation in this expression depends on the next, leading to serial computation. However, commutativity allows rewriting F=(A*B)*(C*D) where there are clearly two operations that do not depend on each other and that may be executed in parallel. In general, a tree of pair-wise compositing operations may be derived with a height that is logarithmic in the number of layers.

Each pixel value to be blended may be weighted relative to the value of any other pixel. For example, when three image objects have overlapping portions and each image objects has a 50% alpha value, the resulting display will have 12.5% contribution from the background, 12.5% contribution from the first image object drawn, 25% contribution from the second image object drawn, 50% contribution from the third image object drawn.

With reference again to FIG. 5B, the reordered image objects are depicted in column 525b alongside the original image object order in column 515b. As can be appreciated by comparing column 505a of FIG. 5A with column 520b of FIG. 5B, the original layered digital image data requires three draw calls to render a corresponding display while the reordered digital image data requires only two draw calls to render a corresponding display. It should be appreciated that original layered digital image data having a high ratio of a number of layers with respect to a number of different image object types will benefit with respect to required processing resources, the example of FIGS. 5A and B, having three layers in the original layered digital image data and two different image object types, was chosen for ease of illustration.

Figure 4B:
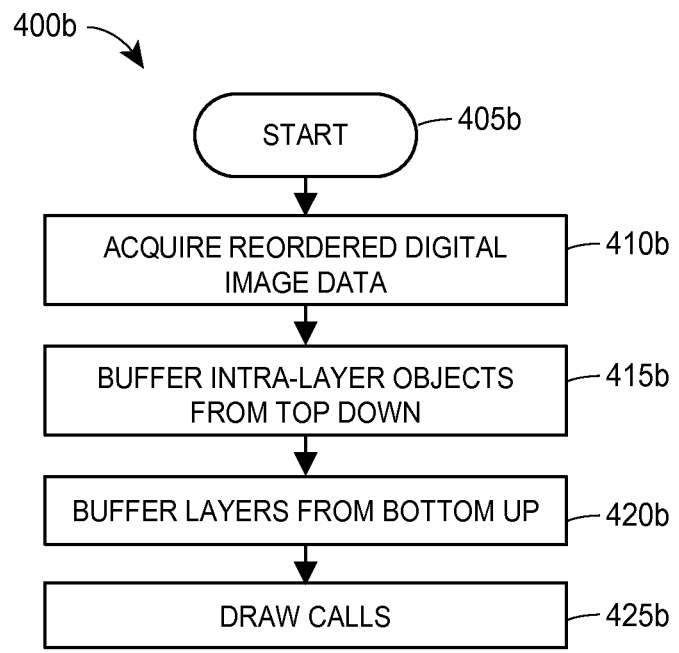

FIG. 4B depicts a display rendering routine 400b suited for execution on a client device 116-122. The display rendering routine is initiated in start block 405b. Next, a set of reordered digital image data is acquired in block 410b. Intra-layer image objects are buffered consecutively starting from a topmost image object (i.e. top being closest to a viewer) and proceeding to a bottommost image object in block 415b. The first and second layers of the reordered digital image data are buffered consecutively starting from a bottom layer (i.e. bottom being furthest away from a viewer) in block 420b. Individual draw calls to render each layer are performed in block 425b.

In a specific implementation of the display rendering routine 400b as applied to the example of FIGS. 5A and 5B, a first group of intra-layer objects from an original set of layered digital image data are buffered such that the first original layer comprising three interior fill objects (i.e. original image object order 2, 4, 6) is buffered with an image object order 6, 4, 2, followed by the second original layer comprising two interior fill objects (i.e. original image object order 8, 10) being buffered with an image object order 10, 8, and the third original layer comprising four interior fill objects (i.e. original image object order 12, 14, 16, 18) being buffered with an image object order 18, 16, 14, 12. A second group of intra-layer objects from the original set of layered digital image data are buffered such that the first original layer comprising three outline objects (i.e. original image object order 1, 3, 5) is buffered with image object order 5, 3, 1, followed by the second original layer comprising two outline objects (i.e. original image object order 7, 9) that is buffered with image object order 9, 7, and followed by the third original layer comprising four outline objects (i.e. original image object order 11, 13, 15, 17) buffered with image object order 17, 15, 13, 11. A first draw call is performed in block 425b that renders the interior fill objects on a display followed by a second draw call that renders the outline objects.

The first and second draw calls may include the same set of image object attributes. Some of the attributes, however, are assigned different values (i.e. different line type, different line width, different color, etc.). With reference once again to a roadway map, both the interior fill objects and the outline objects are represented visually as lines. The line width attribute for the outline objects is greater than the line width for the interior fill objects. By rendering the interior fill objects over the corresponding outline objects, the desired appearance for a roadway is achieved having an outline of a first color with a second color in between as illustrated with reference to FIGS. 6A, 6B, 7A, 7B, 8 and 9.

For the sake of illustration, FIG. 6A depicts an underpass 600a of a first roadway 605a passing under a second roadway 615a at area 610a. The first roadway 605a has outlines 606a, 607a and the second roadway 615a has outlines 616a, 617a. No alpha blending is provided between the first roadway and second roadway at area 610a. Thus, both the outlines and the interior portion of roadway 615a are depicted as being continuous through area 610a.

Similar to FIG. 6A, FIG. 6B depicts an underpass 600b of a first roadway 805b passing under a second roadway 615b at area 610b. The first roadway 805b has outlines 606b, 607b and the second roadway 610b has outlines 616b, 617b. Unlike, the example of FIG. 6A, alpha blending is provided between the first roadway 605b and second roadway 615b in area 610b. As such, both the corresponding outlines and interior portions of the roadways 605b, 615b visually illustrate overlap in the area 610b. The color of area 610b is an alpha blending of the color of the interior portion of roadway 605b and the color of the interior portion of roadway 615b. When z-values are assigned to the individual image objects according to a z-value assignment routine described herein, alpha blending is not used when image objects of differing types overlap one another. Alpha blending is performed only for overlapping image objects of the same type. For example, the overlapping portions of interior fill objects are alpha blended with one another, however the interior fill objects are not alpha blended with overlapping portions of outline objects.

FIG. 7A depicts an intersection 700a of a first roadway 705a with a second roadway 715a at area 710a. The first roadway 705a has outlines 706a, 707a and the second roadway 710a has outlines 716a, 717a. No alpha blending is provided between the first roadway and the second roadway at area 710a because the roadways intersect and, therefore are typically the same color. As such, both the corresponding outlines and interior portions of the roadways 705a, 715a visually illustrate that the roadways intersect.

FIG. 7B depicts an intersection 700b of a first roadway 705b with a second roadway 715b at area 710b. The first roadway 705b has outlines 706b, 707b and the second roadway 715b has outlines 716b, 717b. Alpha blending is provided between the first roadway and the second roadway at area 710b. As can be appreciated by comparison of FIGS. 6A and 6B with FIGS. 7A and 7B, alpha blending enhances the visual appearance of overlapping roadways. On the other hand, alpha blended detracts from the visual appearance of intersecting roadways.

Figure 8:
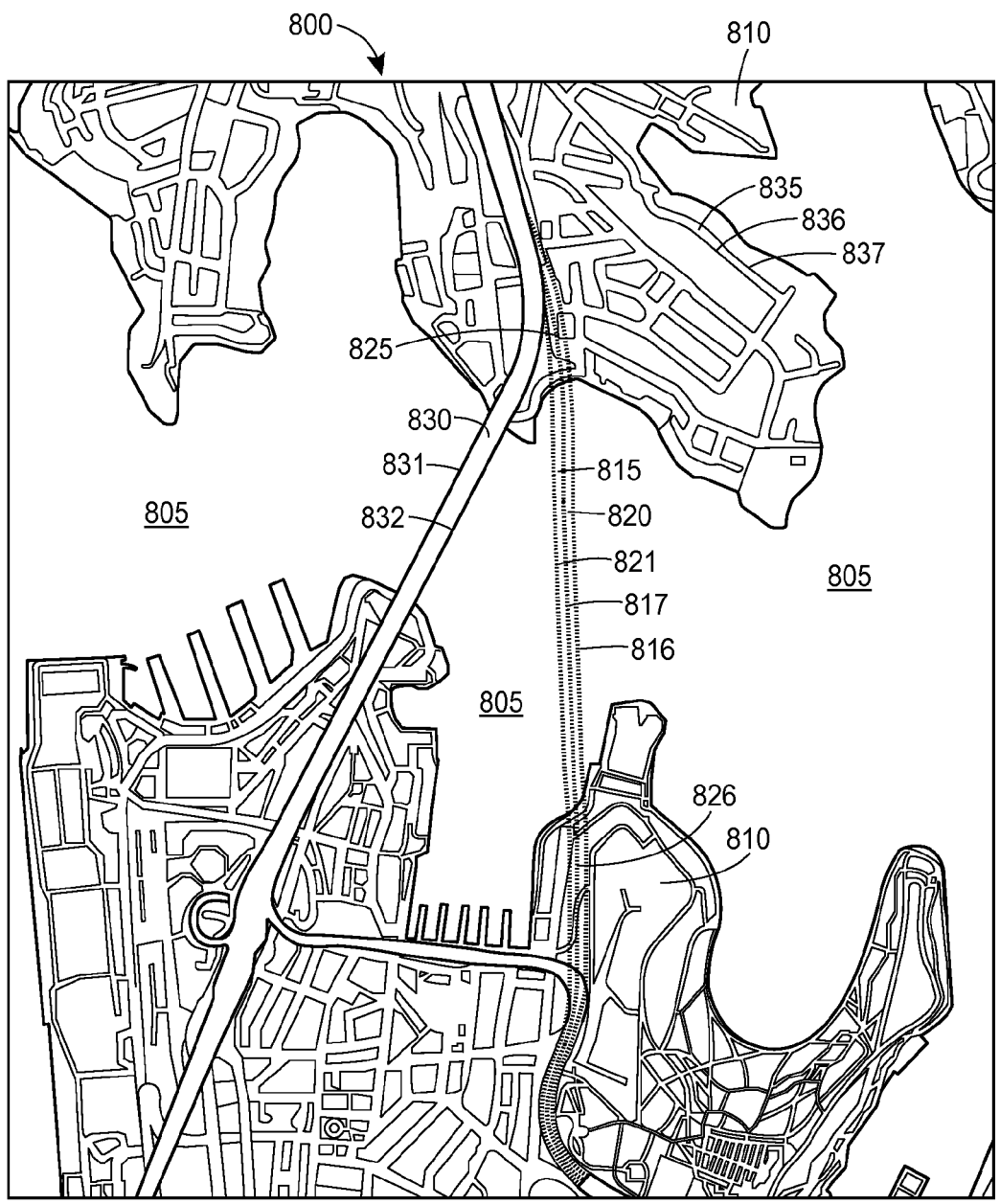
FIGS. 8 and 9 depict displays of rendered digital image data.

FIG. 8 depicts a digital image display 800 comprising a bay area 805 having land 810 on either side. A first interior fill object 815 and a second interior fill object 820 and associated outline objects 816, 817, 821 indicate a tunnel under the bay area 805. The areas 825, 826 indicate the tunnel entrances and exits. A second interior fill object 830 and associated outline object 831, 832 indicate a bridge over the bay area 805. A third interior fill object 835 and associated outline object 836, 837 indicate roadways on the land 810. FIG. 8 depicts a tunnel represented as a dashed outline layered and alpha blended with other roadways, such that the dashed outline visually indicates that the tunnel extends under the water and beneath other roadways.

Both, the dashed outline objects and the interior fill objects associated with the tunnel are visually represented within the display 800 in the areas 825, 826. Neither the dashed outline objects nor the interior fill objects associated with the tunnel are obscured by any of the image objects associated with the land (or water), the image objects associated with the surface roadways or image objects associated with the overpasses. The overlapping portions of interior fill objects associated with the tunnel, the land (or water), the surface roadways and the overpasses are alpha blended with one another to visually reflect when only two interior fill objects are overlapping, when three interior fill objects are overlapping, etc. The resulting color of the associated overlapping interior fill object portions is an alpha blending of each individual interior fill object portion.

Rendering a display using the original set of layered digital image data requires use of intermediate images. For example, rendering a display with the dashed outline objects associated with tunnels proceeds by: 1) render a thick fully opaque dashed outline object in grey into an intermediate image, 2) render a slightly thinner solid interior fill object in clear into the intermediate image without alpha blending (i.e. replace the opaque grey pixels in the intermediate image with fully transparent pixels in overlapping portions, so the grey is gone within the interior portion of the tunnel) and 3) composite the intermediate image onto the base map below it using alpha blending. When a pixel in the area in the middle of the tunnel within the water is tracked through the rendering process: 1) the pixel starts as blue representing water, 2) an intermediate image is created having a blue background, 3) render the dashed outline object into the second intermediate image resulting in an opaque, dashed grey outline object, 4) render the clear, tunnel interior fill object into the second intermediate image resulting in a clear interior fill object and a dashed grey tunnel outline and 5) composite the two intermediate images with alpha blending such that the blue background appears with a tunnel represented by a dashed grey outline. Without use of the intermediate image and rendering the tunnel outline object and interior fill object directly onto the background produces different results. Rendering a display in this sequence proceeds by: 1) the pixel starts blue from water, 2) render the grey dashed outline object, the pixel becomes grey and 3) render the clear solid interior fill object, the pixel becomes clear if alpha blending is not used and remains grey if alpha blending is used. The pixels associated with the interior portion of the tunnel remain blue. Therefore, the intermediate images are required when rendering a display using the original set of layered digital layer data. Even when the layer object rendering order is reversed and the layer objects are rendered directly on the background, the intermediate images are required when rendering a display using the original set of layered digital image data. For example, tracking a pixel within the interior portion of a tunnel within the area of the water proceeds by: 1) the pixel starts blue, 2) render the clear solid interior fill object, either the pixel becomes clear if alpha blending is not used or it stays blue if alpha blended is used and 3) render the grey dashed outline object, the pixel becomes grey. Once again, the desired result is to have the pixels associated with the interior portions of the tunnel blue.

When z-buffering is utilized such that the interior fill object is closer to the viewer than the corresponding outline object and a display is rendered using the reordered digital image data the rendering sequence proceeds by: 1) the pixel starts blue with a lower z-value than either the tunnel outline object or the tunnel interior fill object, 2) render the clear solid interior fill object, either the pixel becomes clear if alpha blending is not used or the pixel stays blue when alpha blending is used, the resulting pixel z-value comes closer to the viewer and 3) render the grey dashed outline object, the pixel would become grey, however the dashed grey outline object has a z-value further from the viewer than the pixel currently has, thus no change occurs. As desired, the resulting pixel is blue when alpha blending is used. Thus, the desired result is achieved when rendering a display using the reordered digital image data by rendering the interior fill object first with a z-value closer to the viewer than the z-value for the corresponding outline object.

Figure 9:
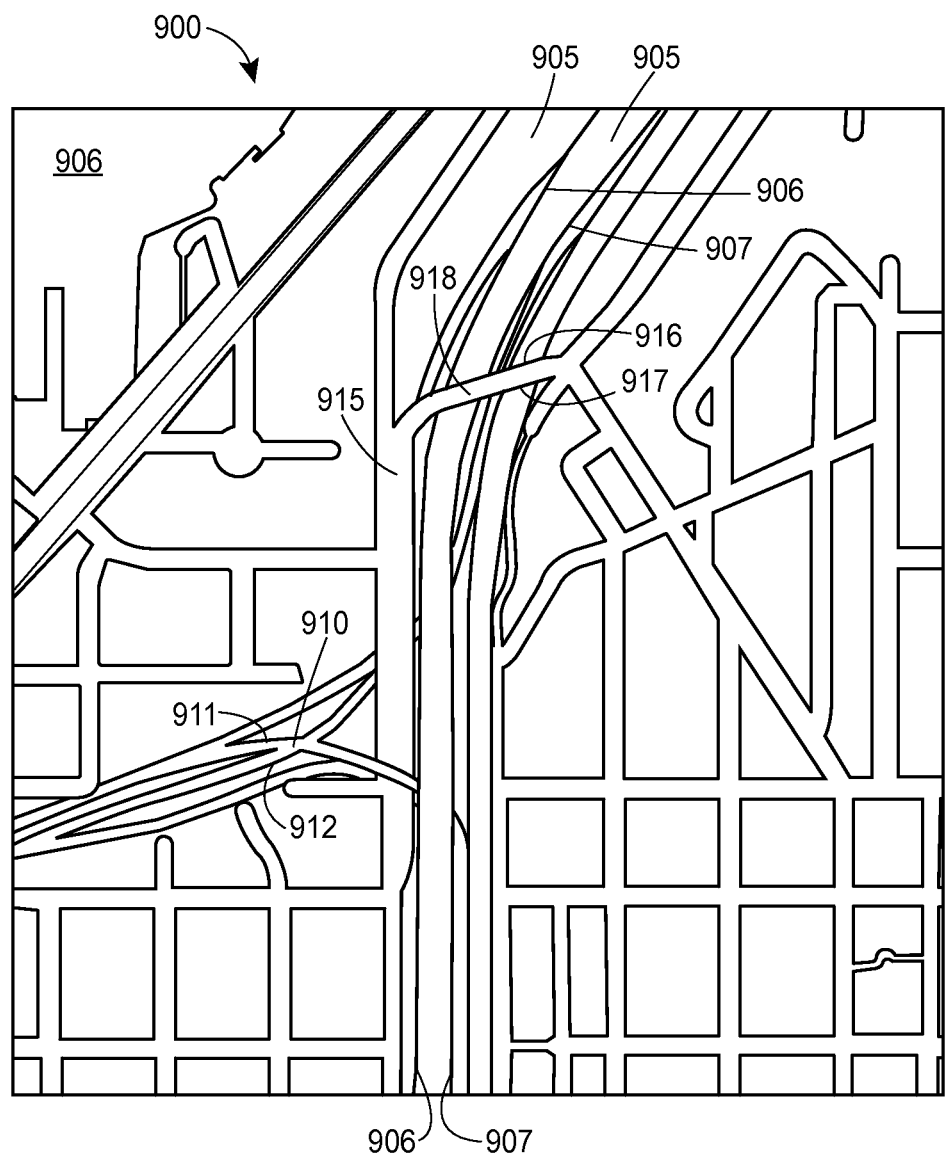

FIG. 9 depicts a digital image display 900 comprising land 906 having a highway depicted with a first interior fill object 905 and associated outline object 906, 907. A series of exit ramps extending from the highway to local roadways is depicted with a second interior fill object 910 and associated outline object 911, 912. A local roadway is depicted with a third interior fill object 915 and associated outline object 916, 917 crossing over the highway in area 918. In at least one embodiment, the area 918 of third interior fill object 915 and the first interior fill object 905 are alpha blended as depicted in FIG. 6B. The visual effect of transparency is often desirable in instances such as those depicted in FIG. 9 where area 918 is a combination of a base aerial photograph and two crossing roadways stacked above the base layer. The outlines 916, 917 are continuous and the outlines 906, 907 are discontinuous, visually indicating which roadway crosses over top. The interior fill objects associated with area 918 are alpha blended with 33.33% base layer color, 33.33% roadway 905 and 33.33% roadway 915. The interior fill objects associated with area 918 may, alternatively, be an alpha blending of 50% base layer color, 25% roadway 905 and 25% roadway 915. In either event, the interior fill objects are not alpha blended with the outline objects.

A transparent overpass may be rendered to provide view of underlying image objects when rendering a display using the reordered digital image data. For example, a green background with a 50% opaque white road interior and a 100% opaque black outline may be depicted under a 50% opaque yellow road interior with 100% opaque black outline. When rendering a display using the reordered digital image data, the white interior fill object of the road is rendered before the corresponding outline object. The rendering process proceeds by: 1) start with a green background with a z-value that is far away from the viewer, 2) render the interior fill object with 50% white the background resulting in 50% green and 50% white and having a z-value that is mid-level with respect to the viewer, 3) render the black outline object having a z-value that is farther away with respect to a viewer when compared to the white interior fill object, therefore the pixels associated with the outline object within the confines of the interior fill object area remain white, 4) render the yellow interior fill object having 50% yellow and a z-value that is close to the viewer, the result is a background 25% green, 25% white and 50% yellow and 5) render the black outline object having a z-value that is farther away with respect to a viewer than the z-value associated with the corresponding yellow interior fill object, therefore the pixels associated with the interior portion of the yellow interior fill object remain unchanged. Rendering a display using the reordered digital image data achieves the desired result to provide transparent overpasses.

When a display is rendered using an original set of layered digital image data an intermediate image is required to produce a transparent overpass. The display rendering process proceeds by: 1) render a thick 100% opaque black line into an intermediate image for the outline of the white road, 2) render a thinner 50% opaque white line into the intermediate image without alpha blending, replacing the black in overlapping portions with white, 3) composite the intermediate image onto the background with alpha blending to get 50% green background and 50% white road with 100% black outline, 4) render a thick 100% opaque black outline object into a second intermediate image associated with the outline of the yellow road, 5) render a thinner 50% opaque yellow interior fill object into the second intermediate image without alpha blending, replacing the black outline object in overlapping portions with yellow and 6) composite the second intermediate image onto the background with alpha blending to get 25% green background, 25% white road and 50% yellow road. Tracking a pixel through the corresponding rendering process proceeds with: 1) the background is green, 2) create an intermediate image with a background that is green, an interior portion of the road is white, 3) render a black outline object associated with an outline of the white road, the background is green and the roadway outline is black, 4) render the white road interior, the background is green, intermediate is 50% opaque white, 5) the intermediate image with the background, the resulting roadway interior portion is 50% green and 50% white, 6) create a second intermediate image with a background that is 50% green and 50% white, 7) render a black outline object associated with the outline of the yellow road, the result is 50% green and 50% white with a black outline for the yellow road, 8) render a yellow interior fill object, the result has a background with 50% green and 50% white interior fill object and is 50% opaque yellow interior fill object and 9) composite the intermediate images with alpha blending, resulting in an overlapping portion that is 25% green, 25% white and 50% yellow.

Rendering a display using the original set of layered digital image data without an intermediate image results in: 1) green, 2) black, 3) 50% black 50% white, 4) black and 5) 50% black and 50% yellow. This does not achieve having a transparent overpass. A similarly undesirable result occurs when the image object rendering is reversed, where z-values are used and alpha blending is used: 1) start with a green background and a corresponding z-value that is far from the viewer, 2) add 50% yellow, the result is 50% green 50% yellow, the resulting z-value is nearer the viewer, 3) render a black outline object with a z-value that is farther away from the viewer than the corresponding interior fill object, resulting in the black being omitted in overlapping portions, 4) render the white road with a z-value that is farther away from the viewer than compared to the yellow interior fill object, the result is that the white is occluded in overlapping portions, 5) render the black outline having a z-value that is farther away from the viewer when compared to the yellow interior fill object, therefore the black outline object is occluded in overlapping portions. The result is 50% green and 50% yellow and the white interior fill object is not alpha blended, which is not desirable. Even when the white road is assigned a higher z-value, such that the white road is not occluded, the rendering process proceeds by: 1) start with a green background having a z-value that is far from the viewer, 2) add 50% yellow, the result is 50% green and 50% yellow, the resulting z-value is near the viewer, 3) render the black outline object having a z-value that is farther away, such that the black outline object is occluded in overlapping portions, 4) render the white road interior fill object having a z-value that is close to the viewer, the result is 25% green, 25% yellow and 50% white, the resulting z-value is closer to the viewer and 5) render the black outline object having a z-value that is farther away, such that the black outline object is occluded in overlapping portions. It is desirable to have the yellow strongest, instead the resultant is white.

A method to render layered digital image data without render each layer individually extends to the generic concept of rendering data in layers, where each layer does not utilize alpha blending of image objects within the given layer. However, the individual layers themselves are alpha blended together. For example, a set of original layered digital image data associated with an anatomical diagram of the human body having the skeletal system, circulatory system, etc. as different layers where within the individual layer only the topmost object is rendered at each pixel, but layers are alpha blended on top of each other. This allows a viewer of a client device, for example, to turn the muscles to 50% opacity to see behind to the organs and see how they line up, rather than just seeing through the top muscle to a muscle beneath it and another muscle beneath it, so the viewer of the client device cannot see through to the organs well enough.

A layer may be rendered in multiple passes over the same data by ensuring the z-depth values for each pass within a layer are greater than the z-depth values of any previous pass of that layer, but less than the z-depth values of any pass of any layer on top with respect to a viewer. Rendering the passes in reverse order, last to first, results in the desired display being achieved. As an example, a layer of image objects with drop shadows (i.e. speech bubbles in a cartoon) can be depicted in a display. The drop shadows are rendered first by rendering the bubbles in a transparent black color with a translation down and to the right with respect to an associated speech bubble. After rendering all of the shadows for a given layer, the speech bubbles themselves are rendered in a desired color and location with no alpha blending, such that the occluded shadow areas are completely replaced by the corresponding portion of the speech bubble. This sort of two pass rendering may also be achieved by rendering the last pass first and ensuring the z-depth function values are assigned as described herein, such that the speech bubbles are rendered first and occlude part of where the shadows would be drawn otherwise. When the shadows are subsequently rendered, the shadows are not rendered in those overlapping areas, giving the same appearance as if the shadows had been drawn first and then occluded.

It should be understood that a given digital image data reordering routine may create additional layers of digital image data (i.e. a third set, fourth set, . . . etc.). For example, an original set of digital image data may contain image objects related to the human anatomy arranged within various layers. A digital image data reordering routine in accordance with the present disclosure, when executed, provides: a first layer of digital image data corresponding to "skin" objects; a second layer of digital image data corresponding to "muscular" objects; a third layer of digital image data corresponding to "skeletal" objects; a fourth layer of digital image data corresponding to "nerve" objects; . . . etc.

It should be understood that the specific examples and embodiments described in detail herein are intended to provide description of the best mode of carrying out the invention and to satisfy the written description to enable one of ordinary skill to make and use the invention. In no way should these examples and embodiments be construed to limit the scope of the appending claims.

The invention claimed is:

1. A computer-implemented method for reordering an original set of layered image data for use in rendering a display, comprising:
   obtaining at a computer device an original set of layered image data comprising multiple original layers of image data arranged to be rendered to form intermediate images prior to the intermediate images being rendered in a display, each of the original layers of image data comprising a plurality of image objects arranged in an intra-layer image object order;
   executing an image data reordering routine on the computer device that extracts a set of image objects of a first type from two or more of the original layers of image data and creates a set of reordered image data for use as a single reordered layer of image data for use in rendering a display, said reordered layer of image data comprising image objects of the first type ordered as a function of the identity of the original layers of image data from which each of the image objects of the first type was extracted and as a function of the intra-layer image object order of the original layers of image data from which each of the image objects of the first type was extracted; and
   storing at the computer device said reordered layer of image data.

2. The computer-implemented method of claim 1 wherein the multiple original layers of image data are received as being associated with an ascending order and wherein executing the image data reordering routine includes reordering the image objects of the first type so that all of the image objects of the first type from a particular one of the original layers of image data are located in the reordered layer of image data prior to any of the image objects of the first type from any of the original layers of image data in the ascending order subsequent to the particular one of the original layers of image data, and so that each of the image objects of the first type from the particular one of the original layers of image data are located in the reordered layer of image data after all of the image objects of any of the original layers of image data in the ascending order prior to the particular one of the original layers of image data, and wherein the image objects of the first type of each of the original layers of image data are located in the reordered layer of image data in reverse order of the intra-layer image object order of each of the original layers of image data.

3. The computer-implemented method of claim 2, wherein the image objects of the first type are line objects representative of a roadway in a geographic map.

4. The computer-implemented method of claim 2 wherein executing the image data reordering routine further includes extracting a set of image objects of a second type from two or more of the original layers of image data and creates a further set of reordered digital image data for use as a second reordered layer of image data.

5. The computer-implemented method of claim 4, wherein said image objects of the first type are interior fill objects representative of an interior portion of a roadway in a geographic map and said image objects of a second type are outline objects representative of an outline portion of a roadway in a geographic map.

6. The computer-implemented method of claim 5 further comprising executing a z-value assigning routine stored on the memory that assigns a z-value to each image object as a function of the image object type, the identity of the original layer within which the image object was located, and the original position of the image object in the intra-layer image object order, to maintain an original relative image object depth.

7. The computer-implemented method of claim 6 further comprising executing a display rendering routine using said first and second reordered layers of image data to render a display, wherein said display rendering routine renders said interior fill objects before said outline objects, such that said interior fill objects occlude associated outline objects in overlapping areas in the display.

8. The computer-implemented method of claim 1 further comprising executing a display rendering routine using said set of reordered image data to render a display.

9. The computer-implemented method of claim 1, further comprising further comprising executing an alpha attribute value assigning and blending routine that assigns an alpha attribute value to each image object and that alpha blends overlapping portions of image objects of the same image object type for rendering a corresponding display to visually depict overlapping portions.

10. A digital image processing system for use in rendering an image on a display, comprising;
   a communications network interface;
   one or more processors;
   one or more memories coupled to the one or more processors;
   a routine stored on at least one of said one or more memories that executes on one of the one or more processors to obtain an original set of layered digital image data comprising multiple original layers of image data arranged in an ascending order to be rendered in a display, each original layer of image data comprising a plurality of image objects of different types arranged in an intra-layer image object order;
   a digital image data reordering routine stored on one of the one or more memories that, when executed on one of the one or more processors, extracts a first set of image objects of a first type from said original set of layered digital image data and creates a set of reordered digital image data, said set of reordered digital image data comprising a first layer comprising image objects of the first type, wherein the digital image data reordering routine reorders the image objects of the first type so that all of the image objects of the first type from a particular one of the original layers of image data are located in the reordered digital image data prior to any of the image objects of the first type from any of the original layers of image data in the ascending order subsequent to the particular one of the original layers of image data, and so that each of the image objects of the first type from the particular one of the original layers of image data are located in the reordered digital image data after all of the image objects of any of the original layers of image data in the ascending order prior to the particular one of the original layers of image data, and wherein the image objects of the first type of each of the original layers of image data are located in the reordered digital image data in reverse order of the intra-layer image object order of each of the original layers of image data; and
   a z-value assigning routine stored on one of the or more memories that, when executed, assigns a z-value to each image object in the reordered digital image data as a function of the order of the image object in the reordered digital image data.

11. The digital image processing system of claim 10 further comprising a client device configured to receive a reordered set of digital image data via a communication network, said client device comprising a display device and a display rendering routine that, when executed renders an image on the display using the set of reordered digital image data.

12. The digital image processing system of claim 10 further comprising a routine that, when executed sends the reordered digital image data via a communications network to a client device for rendering on a client device display.

13. The digital image processing system of claim 10, wherein said image objects of the first type are line objects representative of a roadway in a geographic map.

14. The digital image processing system of claim 10, wherein the digital image data reordering routine executes to extract a further set of image objects of a second type from said original set of layered digital image data and wherein the digital image data reordering routine executes to create a further set of reordered digital image data, said further set of reordered digital image data comprising image objects of the second type, wherein the digital image data reordering routine reorders the image objects of the second type so that all of the image objects of the second type from a particular one of the original layers of image data are located in the further set of reordered digital image data prior to any of the image objects of the second type from any of the original layers of image data in the ascending order subsequent to the particular one of the original layers of image data, and so that each of the image objects of the second type from the particular one of the original layers of image data are located in the further set of reordered digital image data after all of the image objects of any of the original layers of image data in the ascending order prior to the particular one of the original layers of image data, and wherein the image objects of the second type of each of the original layers of image data are located in the reordered digital image data in reverse order of the intra-layer image object order of each of the original layers of image data.

15. The digital image processing system of claim 14, wherein said image objects of the first type are interior fill objects representative of an interior portion of a roadway in a geographic map and said image objects of the second type are outline objects representative of an outline portion of a roadway in a geographic map.

16. The digital image processing system of claim 15, wherein the display rendering routine executes to render said interior fill objects before said outline objects, such that said interior fill objects occlude associated outline objects in overlapping areas in a display.

17. The digital image processing system of claim 10, wherein the display rendering routine alpha blends overlapping portions of image objects of the same image object type when rendering a corresponding display to visually depict overlapping portions.

18. The digital image processing system of claim 10 further comprising an alpha attribute value assigning and blending routine that, when executed, assigns an alpha attribute value to each image object and that alpha blends overlapping portions of image objects of the same type.

19. The digital image processing system of claim 10, wherein the z-value assigning routine, when executed, assigns a z-value to each image object as a function of: i) the image object type, ii) the original layer within which the image object was located, and iii) the original order of the image object, to maintain the original relative image object depth.

20. A non-transitory computer-readable medium having instructions including a digital image data reordering routine stored thereon for use in an imaging system having a processor and a display rendering routine and for use in rendering a display without rendering each layer of an original set of layered digital image data in an intermediate image, the digital image data reordering routine comprising:
a first data access routine stored on a memory that, when executed on the processor, accesses an original set of layered digital image data comprising multiple original layers arranged to be rendered to form intermediate images prior to the intermediate images being merged for use in rendering a display, each original layer comprising a plurality of image objects arranged in an intra-layer image object order and the original layers being ordered in an ascending order;
one or more digital image data processing routines that, when executed on the processor, extracts a first set of image objects from said original set of layered digital image data and creates a set of reordered digital image data, said set of reordered digital image data comprising a first layer comprising image objects of a first type, wherein the one or more digital image data processing routines reorders the image objects of the first type so that all of the image objects of the first type from a particular one of the original layers are located in the set of reordered digital image data prior to any of the image objects of the first type from any of the original layers in the ascending order subsequent to the particular one of the original layers of image data, and so that each of the image objects of the first type from the particular one of the original layers are located in the set of reordered digital image data after all of the image objects of any of the original layers in the ascending order prior to the particular one of the original layers, and wherein the image objects of the first type of each of the original layers are located in the set of reordered digital image data in reverse order of the intra-layer image object order of the original layers of image data; and
a z-value assigning routine stored on one of the or more memories that, when executed assigns a z-value to each image object in the reordered digital image data as a function of the relative image object depth within the original set of layered digital image data.

21. The non-transitory computer-readable medium of claim 20, wherein said image objects of the first type are line objects representative of a roadway in a geographic map.

22. The non-transitory computer-readable medium of claim 20 wherein executing the digital image data reordering routine further extracts a second set of image objects from said original set of layered digital image data, said set of reordered digital image data comprising a second layer comprising image objects of a second type.

23. The non-transitory computer-readable medium of claim 22, wherein said image objects of a first type are interior fill objects representative of an interior portion of a roadway in a geographic map and said image objects of a second type are outline objects representative of an outline portion of a roadway in a geographic map.

24. The non-transitory computer-readable medium of claim 23 executed on a remote server processor that is configured within a digital image system, said digital image system further comprising a client device, said client device comprising a display rendering routine that, when executed uses said set of reordered digital image data to render a display.

25. The non-transitory computer-readable medium of claim 23, wherein said interior fill objects are rendered before said outline objects, such that said interior fill objects occlude associated outline objects in overlapping areas in a display.

26. The non-transitory computer-readable medium of claim 20, further comprising an alpha attribute assigning and blending routine that, when executed, assigns an alpha attribute value to each image object and that alpha blends overlapping portions of image objects of the same type.

* * * * *